(12) United States Patent
Chen

(10) Patent No.: US 6,847,833 B2
(45) Date of Patent: Jan. 25, 2005

(54) HAND FREE DEVICE COMMONLY SHARED BY MULTIPLE COMMUNICATION DEVICES

(75) Inventor: Tonny Chen, Chang-Hua (TW)

(73) Assignee: E-Lead Electronic Co., Ltd., Chang-Hua (TW)

( * ) Notice: Subject to any disclaimer, the term of this patent is extended or adjusted under 35 U.S.C. 154(b) by 616 days.

(21) Appl. No.: 10/004,450

(22) Filed: Dec. 5, 2001

(65) Prior Publication Data

US 2003/0104845 A1 Jun. 5, 2003

(51) Int. Cl.$^7$ .................................................. H04M 1/00
(52) U.S. Cl. ............................... 455/569.1; 455/569.2; 455/557; 455/550.1; 455/99; 455/345
(58) Field of Search ........................... 455/569.1, 569.2, 455/557, 572, 99, 564, 345, 550.1

(56) References Cited

U.S. PATENT DOCUMENTS

| | | | | |
|---|---|---|---|---|
| 5,953,674 A | * | 9/1999 | Hutchison, IV | 455/557 |
| 6,081,724 A | * | 6/2000 | Wilson | 455/462 |
| 6,266,542 B1 | * | 7/2001 | Stern et al. | 455/569.1 |
| 6,349,223 B1 | * | 2/2002 | Chen | 455/569.2 |
| 6,411,823 B1 | * | 6/2002 | Chen | 455/559 |

FOREIGN PATENT DOCUMENTS

| | | | |
|---|---|---|---|
| DE | 19715596 | * | 10/1998 |
| DE | 10212571 A1 | * | 9/2003 |
| GB | 2327012 A | * | 6/1998 |
| IT | 1119160 A2 | * | 1/2001 |

* cited by examiner

Primary Examiner—Nick Corsaro
Assistant Examiner—Sujatha Sharma
(74) Attorney, Agent, or Firm—Troxell Law Office PLLC

(57) ABSTRACT

A hand free device is commonly shared by a plurality of communication devices, and more particularly to a hand free device which can be used by a plurality of communication devices simultaneously. Such a hand free device includes a microprocessor, more than one I/O interfaces, a multiplexer control unit, more than one multiplexers, a voice processing unit, a speaker amplifying and control unit, a microphone amplifying circuit, a dialing unit, a charging and power supply unit and an artificial interface. Such a hand free device can be simultaneously coupled to multiple communication devices and allows the same to be operable at the same time.

6 Claims, 6 Drawing Sheets

| I/O INTERFACE 1 | I/O INTERFACE 2 | COMMUNICATION DEVICE T1 | COMMUNICATION DEVICE T2 |
|---|---|---|---|
| NON-CONNECTION TO COMMUNICATION DEVICE FLAGPOLE SIGN 0 | NON-CONNECTION TO COMMUNICATION DEVICE FLAGPOLE SIGN 0 | | |
| NON-CONNECTION TO COMMUNICATION DEVICE FLAGPOLE SIGN 0 | CONNECTION TO COMMUNICATION DEVICE FLAGPOLE SIGN 1 | | COMMUNICATION DEVICE T2 IS AVAILABLE |
| CONNECTION TO COMMUNICATION DEVICE FLAGPOLE SIGN 1 | NON-CONNECTION TO COMMUNICATION DEVICE FLAGPOLE SIGN 0 | COMMUNICATION DEVICE T1 AVAILABLE | |
| CONNECTION TO COMMUNICATION DEVICE FLAGPOLE SIGN 1 | CONNECTION TO COMMUNICATION DEVICE FLAGPOLE SIGN 1 | COMMUNICATION DEVICE T1 IS AVAILABLE | COMMUNICATION DEVICE T2 IS AVAILABLE |

FIG. 3

HAND FREE DEVICE COMMONLY SHARED BY MULTIPLE COMMUNICATION DEVICES

BACKGROUND OF THE INVENTION

The present invention relates to a hand free device which can be commonly shared by a plurality of communication devices, and more particularly to a hand free device which can be used by a plurality of communication devices simultaneously. Such a hand free device includes a microprocessor, more than one I/O interfaces, a multiplexer control unit, more than one multiplexers, a voice processing unit, a speaker amplifying and control unit, a microphone amplifying circuit, a dialing unit, a charging and power supply unit and an artificial interface. Such a hand free device can be simultaneously coupled to multiple communication devices and allows the same to be operable at the same time.

As a result of fast advancement in communication technology, and the massive investment of private enterprises in this field, cellular phones become so popular that many people are equipped with more than one cellular phones or phone numbers. A conventional hand free device is only applicable to one cellular phone or communication device. If a person is equipped with more than one communication devices, only one communication device is coupled to the conventional hand free device and the rest communication devices are left uncoupled to the hand free device.

SUMMARY OF THE INVENTION

Therefore, the primary object of the present invention is to provide a hand free device which can commonly shared by a plurality of communication devices at the same time.

Another object of the present invention is to provide a hand free device which can be operated in combination with a stereo system of a vehicle and are coupled to a plurality of communication devices simultaneously

BRIEF DESCRIPTION OF THE DRAWINGS

FIG. 3 is a the true value table of the present invention;

DETAILED DESCRIPTION OF THE PREFERRED EMBODIMENTS

Figure 1:
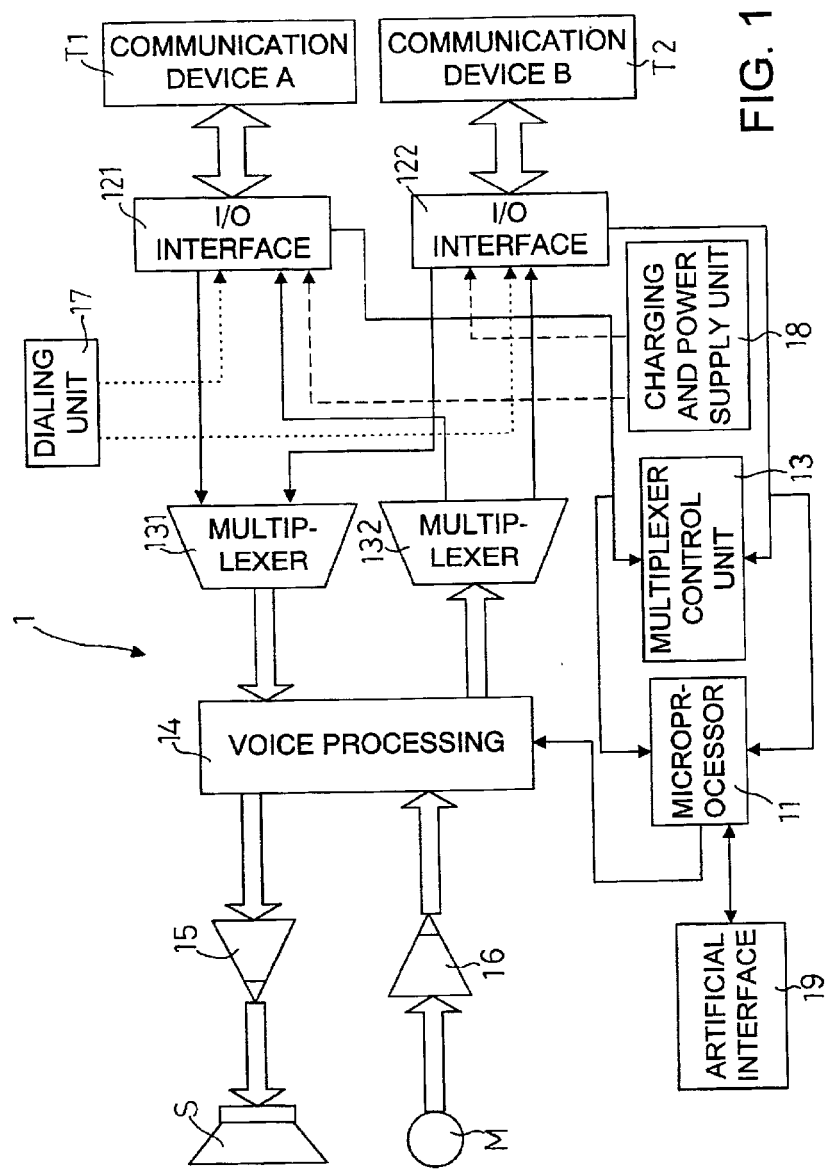
FIG. 1 is a systematic block diagram of the present invention.
Figure 2:
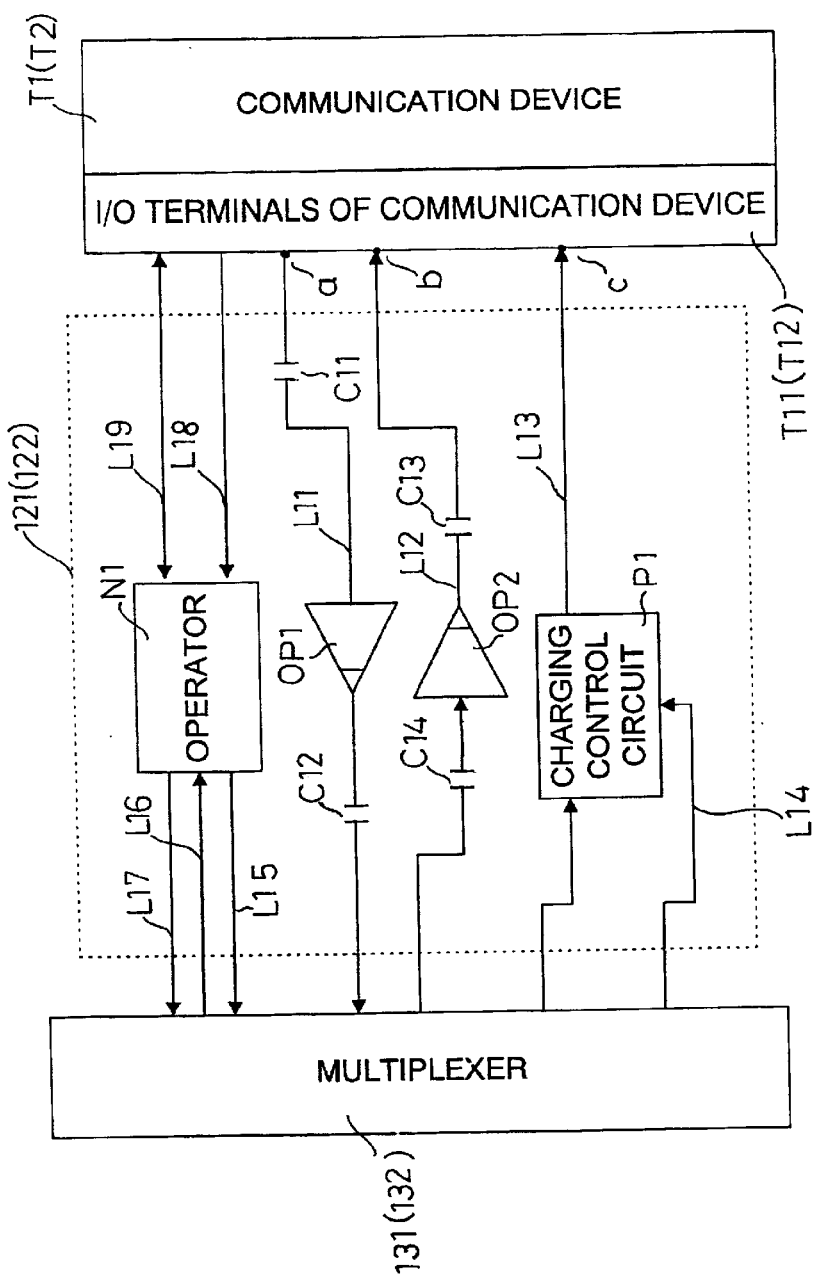
FIG. 2 is a simplified diagram showing the analog type I/O interface of the present invention.

Referring to FIGS. 1, 2, the systematic block diagram of the hand free device 1 of the present invention is illustrated. It mainly comprises a micro processor 11, more than one Input/Output or I/O interfaces 121, 122, a multiplexer control unit 13, at least two multiplexers 131, 132, a voice processing circuit 14, a speaker amplifying and control unit 15, a microphone amplifying circuit 16, a dialing unit 17, a charging and power supply unit 18 and an artificial interface 19, working in combination with a speaker S and a microphone M.

The micro processor 11 is used to coordinate the operation of the individual circuit of all units of the hand free device 1.

The one or more than one I/O interfaces 121, 122 of communication equipment are controlled by the micro processor 11 to convert the input signals from communication devices of various types and brands into manageable signals for the use of end terminals. The connection between the I/O interfaces 121, 122 and the communication devices T1, T2 can be effected by plug holes, signal cables or other means of proper form.

The artificial interface 19 enables a user to input his or her settings, for instance, the control of volume of sound, switch control, switching control and etc. More than one multiplexers 131, 132 have at least one or more than one logic switch controlled by the flagpole signal of the multiplexer control unit 13 to judge that part or whole signals of the communication devices are input or output via the logic switch.

The multiplexer control unit 13 is subject to the control of the microprocessor 11 to control by flag poles the operation of the multiplexers 131, 132.

The voice processing unit 14 subject to the control of the microprocessor 11 is used to regulate the input and output sound. In general, it relates to the acoustic adjustment including elimination of noise and echo, frequency increase or decrease and etc.

The speaker amplifying and control unit 15 under the control of the microprocessor 11 receives and amplifies voice signals from the voice processing unit 14 and control the speaker S to broadcast the processed sound.

The microphone amplifying circuit 16 is used to amplify acoustic signals input from the microphone M for the use of rear end.

The speaker S activated by the speaker amplifying and control unit 15 can be the speaker of a vehicular stereo system or an externally connected speaker or an earphone.

The charging and power supply unit 18 subject to the control of the microprocessor 11 supplies the electrical power to the communication devices T1, T2 and charges the batteries thereof.

The dialing unit 17 can cooperated with a matrix of press buttons, a voice controlled input device to permit a user to make direct dialing operation by way of the present invention without use of the original pressing buttons on the communication devices T1, T2.

Moreover, the I/O interfaces 121,122 are coupled to the hand free device 1 and the I/O terminals T11, T12 (i.e. the signal terminals of cellular phones) of the communication devices T1, T2 by way of a number of electrical circuits. Those electrical circuits include:

The voice signal output line L11 outputs at one end from the hand free device 1 and is coupled at the other end to the input terminal a of the I/O terminals T11, T12 of the communication devices T1, T2; and elements like an amplifier OP1 and capacitors C1, C2 (or resistors) and etc. are mounted in serial to this line.

The voice signal input line L12 inputs to the hand free device 1 at one end and is coupled to the output terminal B of the I/O terminals T11, T12 of the communication device; and elements like an amplifier OP2 and capacitors C3, C4 (or resistors) and etc. are mounted in serial to this line.

The charging line L13 is coupled at one end to the hand free device 1, and is connected at the other end to a charging terminal C of the I/O terminal of a communication device, and on the line is disposed a charging control circuit P which controls the activation of the charging Line 13 and the output charging voltage.

The charging control line L14 for the transmission of an input signal of the charging control line L14 to control the operation of a charging control circuit P which outputs different voltages according to the signals of the charging control line L14 in match with the coupled communication devices T1, T2.

The dialing control line L15 for transmission of the control signals of the dialing unit to control the operator N1 of the I/O interfaces 121, 122.

The common dialing signal line L16 for transmission of dialing control signals has one end coupled to the dialing unit 17 and the other end connected to the operator N1 of the I/O interfaces 121, 122.

The flag pole control line L17 for transmission of flag pole signals to the multiplexers 131, 132 to advise if the I/O interfaces have been coupled to the communication devices T1, T2.

The communication device working time pulse input line L18 is used to transmit the working time pulse of the communication devices T1, T2 so as to permit the hand free device 1 to operate in synchronism with the communication devices T1, T2. One end of the line L18 is coupled to the communication devices T1, T2 and the opposite end is connected to the operator N1 of the I/O interfaces 121, 122.

The communication device analog signal input line L19 is employed to transmit control signals between the communication devices T1, T2 and the operator N1 of the I/O interfaces 121, 122.

The operator N1 is activated by the signals transmitted via the analog signal input line L19 of the communication devices T1, T2 and outputs control signal of if the I/O interfaces 121, 122 are in operation to the rear end of the band free device 1 for use.

By way of the assembly of the previously cited components, when a user is equipped with a single communication device T1 with the present invention employed, the present invention is operated in the following manner:

1. The user can operate the present invention as a hand free device by connecting the communication device to the hand free device 1 via the I/O interface 121; and after the connection is effected, the communication device T1 inputs working time pulse via the communication device working time pulse input line L18 of the I/O interface 121 from the signal output terminal of there so as to enable the present invention to operate in synchronism with the communication device T1. Besides, the operator N1 is activated by a signal transmitted from the communication device analog signal input line L19 and the operator N1 outputs flagpole signals to the multiplexer control unit 13 and the microprocessor 11 so as to permit the microprocessor 11 and the multiplexer control unit 13 to detect the corresponding I/O interface 121 to be in connection to the communication device T1.

2. The user can make use of the artificial interface 19 to set (or the present invention detects automatically) in such a manner that the artificial interface 19 activates the charging control circuit P. Then the charging and power supply unit 18 provides for the working and charging voltages to the communication device T1 by way of the charging line L13.

3. By way of the flagpole signals output from the operator 11, the multiplexer control unit 13 and the microprocessor 11 can control the input and output of the multiplexer 131. A user can transmit voice via the microphone M to the microphone amplifying circuit 16 and the voice processing unit 14 that process the transmitted sound. The voice is further distributed by the multiplexer 131 to a corresponding I/O interface 121. Via the voice input line L12 of the I/O interface 121, the voice is further delivered to the communication device T1 which transmits the voice to the person at the other end of communication. In contrast, the voice of the person at the other end delivered via the voice output line L11 of the I/O interface 121, the multiplexer 131 and voice processing unit 14, speaker amplifying circuit 15 is broadcast by way of the speaker S. Thereby a user can speak with the other person on the line in the same manner as a hand free device.

The proceeding example is basically applied to a single communication device. If a user has more than one communication devices to use, the multiplexer control unit 13 and the microprocessor 11 control the multiplxers 131, 132 and voice processing unit 12. The multiplexers 131, 132 are assigned to the respective input output signals of the communication devices T1, T2. The control details of the multiplexers 131, 132 are given in FIG. 3. As the I/O interfaces 121, 122 are connected to the communication devices T1, T2, the interfaces 121, 122 will output flagpole control signals, i.e., 1 standing for connection to a communication device and 0 standing for non-connection to a communication device. The true value table for application to two interfaces 121, 122 that are used to control the inputs and outputs of the multiplexers is shown in FIG. 3.

Figure 4:
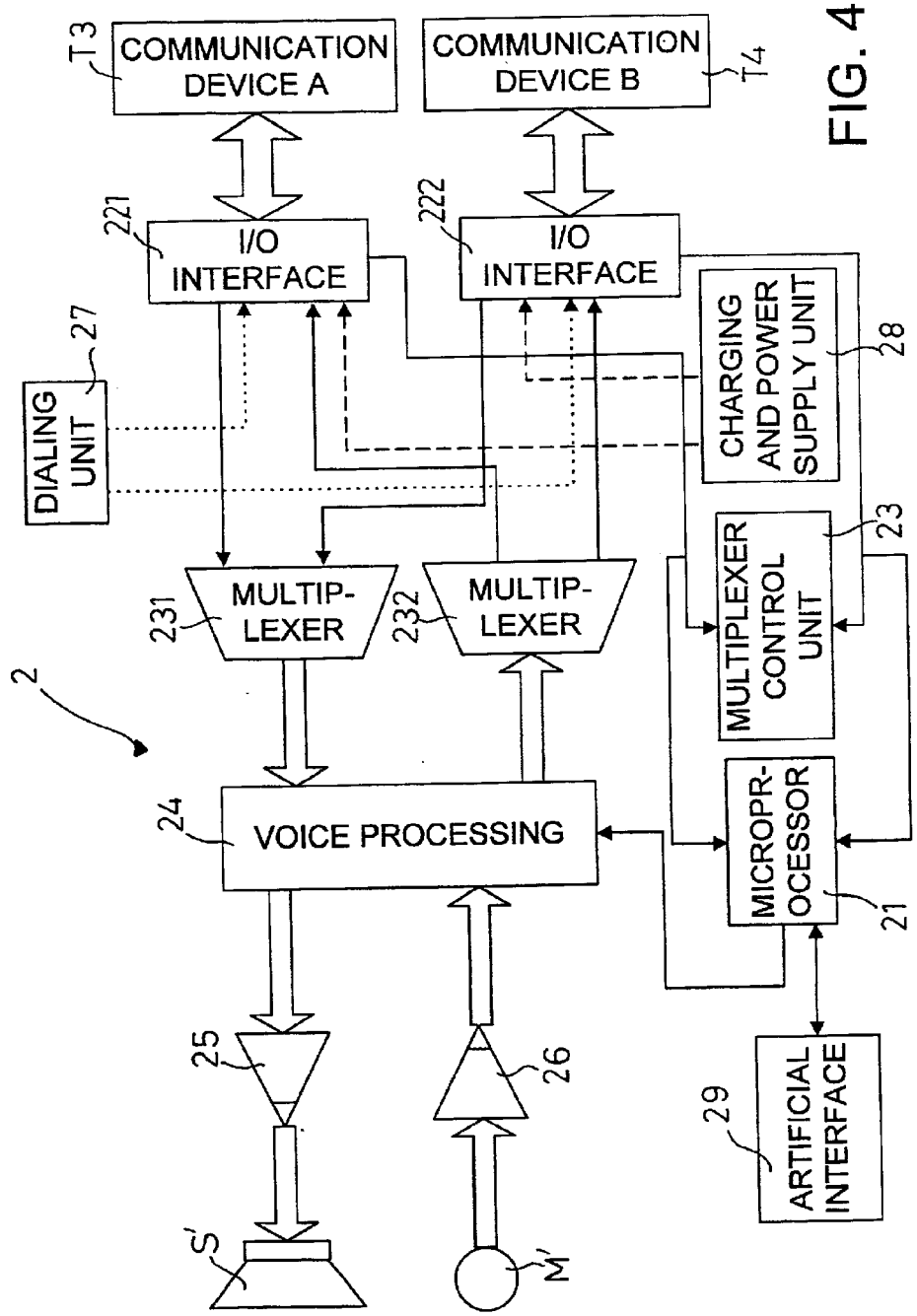
FIG. 4 is a second systematic block diagram of the present invention.
Figure 5:
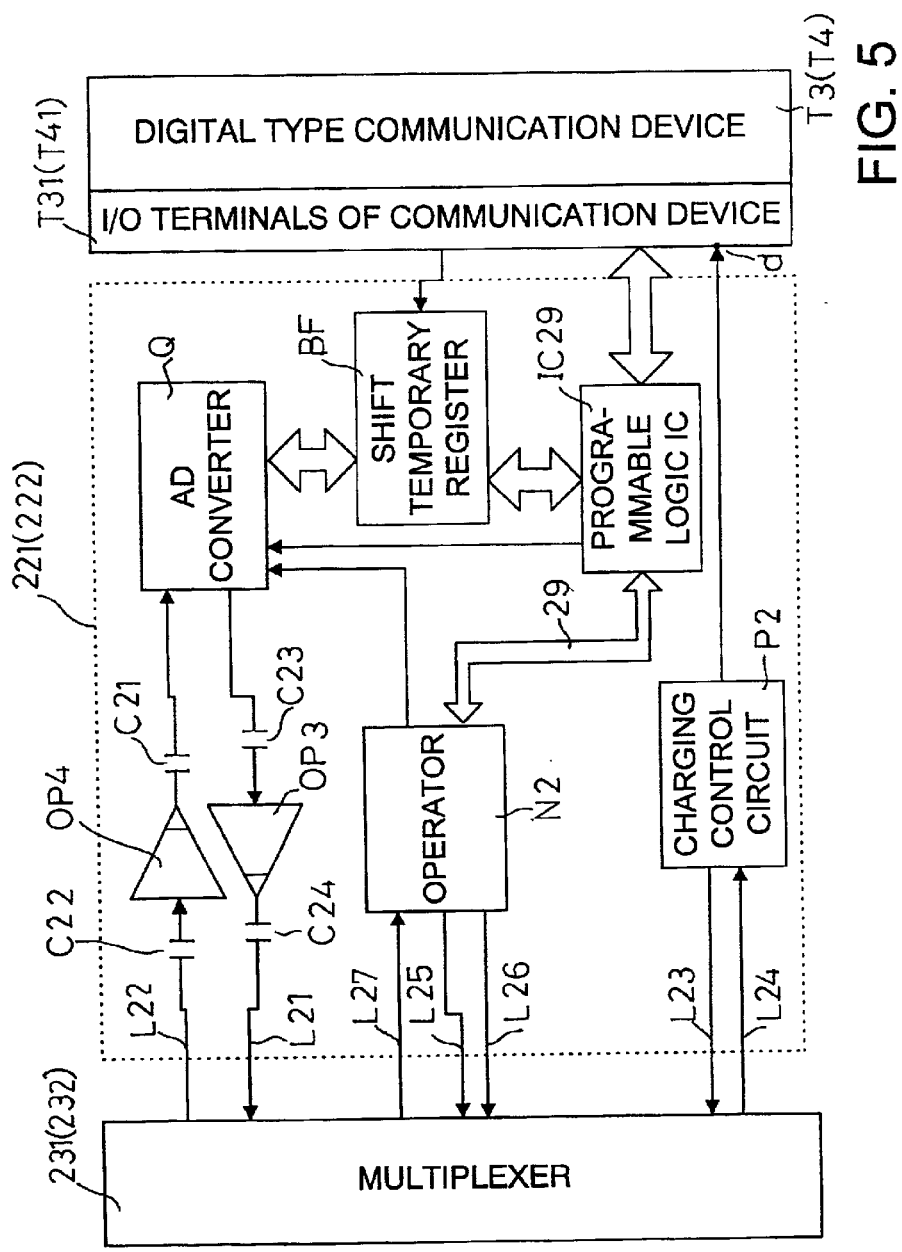
FIG. 5 is a simplified diagram of the digital type I/O interface of the present invention.

The input/output interfaces in the proceeding example are applied only to analog type communication devices T1, T2. In case the communication devices are using digital signals in another embodiment, as shown in FIGS. 4, 5, the hand free device 2 is mainly comprised of a microprocessor 21, more than one I/O interfaces 221, 222, a multiplexer control unit 23 and more than one multiplexers 231, 232, a voice processing unit 24, a speaker amplifying and control unit 25, a microphone amplifying circuit 26, a dialing unit 27, a charging and power supply unit 28 and an artificial interface 29 in addition to a speaker S and a microphone M. The above components are related to one another in the same manner as illustrated in the first embodiment as shown in FIG. 1, the only difference is that the I/O interfaces 221, 222 are replaced by a voice signal output line L121, a voice signal input line L22, a charging line L23, a charging control line L24, a dialing control line L25, a common dialing signal line L26, a flagpole control line L27, communication device signal input line L29, a programmable logic IC IC29, a shift temporary register BF, an AD converter Q, a shift control line L28.

The voice signal output line L21 is connected to the hand free device 2 at one end for input and is coupled to the output terminals of the I/O terminals T31, T41 of the communication devices T3, T4 at the other end, and on the line are serially connected to one another an amplifier OP3, capacitors C23, C24 (or resistors) and etc.

The voice signal input line L22 is connected to the hand free device 2 at one end for output and is coupled to the input terminals of the I/O terminals T31, T41 of the communication devices T3, T4 at the other end, and on the line are serially connected to one another an amplifier OP4, capacitors C22, C21 (or resistors) and etc.

The charging line L23 has one end coupled to the hand free device 2 and another end connected to the charging terminal D of the I/O terminals T31, T41 of the communication devices T3, T4. On the charging line L23 is disposed a charging control circuit P2 which control the activation of the line and the output charging voltage thereof.

The charging control line L24 is used to transmit the input signal of the charging and power supply unit 28 to control the operation of the charging control circuit P2.

The dialing control line L25 transmits the control signals of the dialing unit 27 to control the operator N2 of the I/O interfaces 221, 222.

The common dialing signal line L26 serving to transmit the signals of the dialing unit 27 has one end coupled to the dialing unit 27 and the other end connected to the operator, N2 of the I/O interfaces 221, 222.

The flagpole control line L27 is used to transmit flagpole signals to the multiplexer control unit 13 to advise the same if the I/O interfaces 221, 222 have been connected to the communication devices T3, T4.

The communication device signal input line L29 is used to transmit the control signals between the communication devices T3, T4 and the operator N2 of the I/O interfaces and the input and output message signals in communication. In addition on the line is disposed a programmable logic IC IC29.

The operator N2 is activated by the signals transmitted via the communication devices T3, T4 signal input line L29 to output a control signal to the rear end of the hand free device 2 to advise if the I/O interfaces 221, 222 are in operation or not.

The programmable logic IC IC29 is used to code the input and output data.

The shift temporary register BF serves to permit the AD converter Q and the programmable IC IC29 to temporarily store the corresponding code data therein.

The AD converter Q is used to convert the input/output signals into another operation mode applicable to the rear end of the next components; for instance, to convert the digital signals into analog signals or analog signals into digital signals.

The shift control line L28 permits the communication devices T3, T4 to input control signals.

By way of the I/O interfaces 221, 222 adopted in the second embodiment, it can be easily applied to digital type communication devices T3, T4, and all the structural components of the present invention are identical and are not described in details.

Figure 6:
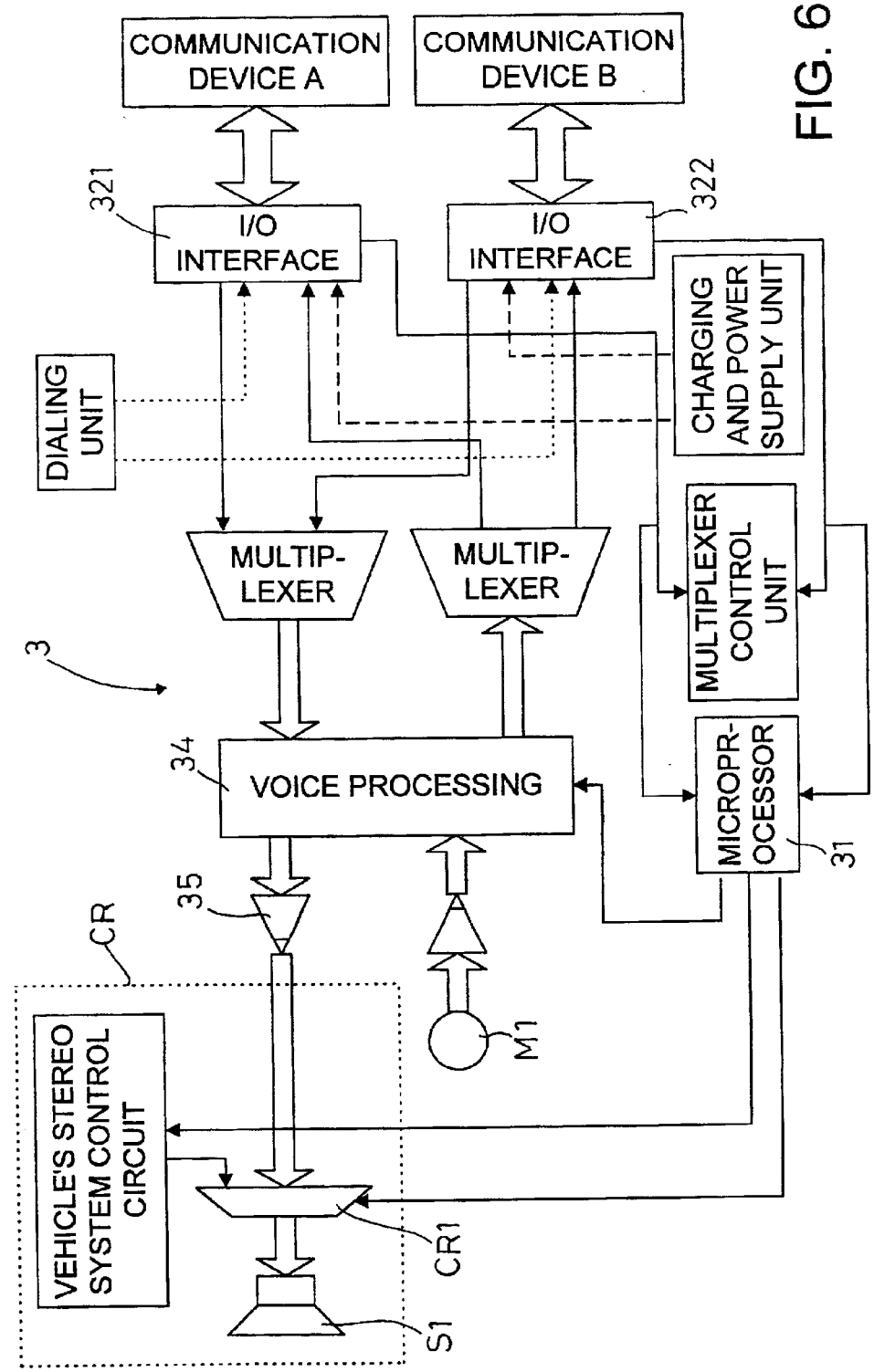
FIG. 6 is a diagram showing the application of the present invention to a vehicular stereo unit.

Referring to FIG. 6, the hand free device 3 of the present invention is combined with a vehicle's stereo system CR in this example wherein the speaker S of the invention is coupled to an output multiplexer CR1 of the stereo system CR; and the microprocessor 31 of the hand free device 3 outputs a control signal to the output multiplexer CR1 of the vehicle's stereo system CR so that when the user is receiving an incoming call, the stereo system CR is set mute or temporarily turned off. Thereby the incoming signals are coded into signals accepted by the hand free device 3 by means of the I/O interfaces 321, 322, and further processed by a voice processing unit 34 and a speaker control and amplifying circuit 35 and broadcast by the speaker S1 of the stereo system CR. In a reverse manner, the user can use the microphone M1 to input voice signals, serving as a hand free device.

In summary, the present invention is simple in structure and easy in operation and is effective in the solution of a convention hand free device being applicable to a single purpose. It offers users a more convenient and practical hand free device to use.

I claim:

1. A hand free device commonly shared by multiple communication devices, comprising a micro processor, one or more than one Input/Output or I/O interfaces, a multiplexer control unit, one or more than one multiplexers, a voice processing unit, a speaker amplifying and control unit, a microphone amplifying circuit, a dialing unit, a charging and power supply unit and an artificial interface, working in combination with a speaker and a microphone; wherein said micro processor is used to coordinate the operation of an individual circuit of all units of said hand free device;

said one or more than one I/O interfaces of communication devices is controlled by said micro processor to convert input signals from said communication devices of various types and brands into manageable signals for the use of rear terminals;

said artificial interface enables a user to input operational settings;

said one or more than one multiplexers have respectively at least one or more than one logic switch controlled by flagpole signals of said multiplexer control unit to judge that part or whole signals of said communication devices are able to be input or output via said logic switch;

said multiplexer control unit is subject to the control of said microprocessor to control by means of flag poles the operation of said multiplexers;

said voice processing unit subject to the control of said microprocessor is used to regulate the input and output of voice;

said speaker amplifying and control unit under the control of said microprocessor receives and amplifies voice signals transmitted from said voice processing unit to control a speaker to broadcast the processed voice;

said microphone amplifying circuit is used to amplify acoustic signals input from said microphone for the use of rear end;

said charging and power supply unit subject to the control of the microprocessor supplies electrical power to said communication devices and charges batteries thereof;

said dialing unit can cooperate with a matrix of press buttons, a voice controlled input device to permit a user to make direct dialing operation without use of original pressing buttons on said communication devices;

whereby a single hand free device can be simultaneously coupled to more than one communication devices.

2. The hand free device commonly shared by multiple communication devices as claimed in claim 1 wherein said I/O interfaces are coupled to the hand free device and the I/O terminals of said communication devices by way of a number of electrical circuits; said electrical circuits include:

a voice signal output line outputs at one end from the hand free device and is coupled at the other end to the input terminal of said I/O terminals of said communication devices; and elements like an amplifier and capacitors (or resistors) and etc. are mounted in serial to this line;

a voice signal input line inputs to said hand free device at one end and is coupled to an output terminal of I/O terminals of said communication device; and an amplifier and capacitors (or resistors) ad etc. are mounted in serial thereto;

a charging line is coupled at one end to said hand free device, and is connected at the other end to a charging terminal of the I/O terminal of a communication device, and on the line is disposed a charging control circuit which controls the activation of a charging operation and the output charging voltage;

a charging control line for transmission of an input signal of said charging control line to control an operation of a charging control circuit which outputs different voltages according to signals of said charging control line in match with coupled communication devices;

a dialing control line for transmission of control signals of said dialing unit to control an operator of said I/O interfaces;

a common dialing signal line foe transmission of dialing control signals has one end coupled to said dialing unit and the other end connected to said operator of said I/O interfaces;

a flag pole control line for transmission of flag pole signals to said multiplexers to advise if said I/O interfaces have been coupled to said communication devices;

a communication device working time pulse input line is used to transmit working time pulses of said communication devices so as to permit said hand free device to operate in synchronism with said communication devices; one end of said pulse input line is coupled to said communication devices and an opposite end thereof is connected to said operator of said I/O interfaces;

a communication device analog signals input line is used for transmission of control signals between said communication devices and an operator of said I/O interfaces;

an operator is activated by signals transmitted via an analog signal input line of said communication devices and outputs control signals of if said I/O interfaces are in operation to an rear end of said hand free device for use.

3. The hand free device commonly shared by multiple communication devices as claimed in claim 1 wherein said I/O interfaces can operate in combination with digital type communication devices, said I/O interfaces include:

a voice signal output line is connected to a hand free device at one end for input and is coupled to the output terminals of the I/O terminals of said communication devices at the other end, and on said voice signal output line are serially connected to one another an amplifier, capacitors (or resistors), a voice signal input line is connected to a hand free device at one end for output and is coupled to input terminals of I/O terminals of said communication devices at the other end, and on the line are serially connected to one another an amplifier, capacitors (or resistors) and etc., a charging line has one end coupled to said hand free device and another end connected to a charging terminal of said I/O terminals of said communication devices; on said charging line is disposed a charging control circuit which controls the activation of the line and the output charging voltage thereof, a charging control line is used to transmit the input signal of said charging and power supply unit to control the operation of said charging control circuit;

a dialing control line transmits control signals of said dialing unit to control an operator of said I/O interfaces;

a common dialing signal line serving to transmit the signals of the dialing unit has one end coupled to said dialing unit and the other end connected to an operator of said I/O interfaces;

a flagpole control line is used to transmit flagpole signals to said multiplexer control unit to advise the same if said I/O interfaces have been connected to said communication devices;

a communication device signal input line is used to transmit the control signals between said communication devices and an operator of the I/O interfaces and the input and output message signals in communication; on said line is disposed a programmable logic IC;

an operator is activated by signals transmitted via said communication devices, signal input line to output a control signal to a rear end of said hand free device to advise if said I/O interfaces are in operation or not;

a programmable logic IC is used to code input and output data;

a shift temporary register serves to permit an AD converter and said programmable IC to temporarily store corresponding code data therein;

an AD converter is used to convert the input/output signals into another operation mode applicable to a rear end of the next components; converting digital signals into analog signals or analog signals into digital signals;

a shift control line permits said communication devices to input control signals.

4. The hand free device commonly shared by multiple communication devices as claimed in claim 1 wherein said I/O interfaces can operate in combination with a speaker of a stereo system of a vehicle without using an external speaker.

5. The hand free device commonly shared by multiple communication devices as claimed in claim 1 wherein said I/O interfaces and said communication device are coupled to each other by a plug hole, signal cable or other available forms.

6. The hand free device commonly shared by multiple communication devices as claimed in claim 1 wherein said voice processing unit generally relates to a means for conducting acoustic adjustment to eliminate noise, echo, and to increase or decrease amplitudes and the like.

* * * * *